United States Patent [19]

DeCeuster et al.

[11] 4,363,699
[45] Dec. 14, 1982

[54] PROCESS FOR STABILIZING SOLUTIONS OF PEROXIDIC COMPOUNDS USED FOR BLEACHING

[75] Inventors: Jean DeCeuster, Vilvoorde; Paul Essemaeker; Edmond Bouillet, both of Brussels; Alain Decamps, Rhode-Saint-Genese; Pierre Ledoux, Brussels, all of Belgium

[73] Assignee: Solvay & Cie., Brussels, Belgium

[21] Appl. No.: 184,053

[22] Filed: Sep. 4, 1980

Related U.S. Application Data

[63] Continuation-in-part of Ser. No. 769,666, Feb. 17, 1977, abandoned.

[30] Foreign Application Priority Data

Feb. 25, 1976 [LU] Luxembourg ............... 74434

[51] Int. Cl.³ .................................................. D21C 9/16
[52] U.S. Cl. ....................................... 162/71; 162/76; 162/78; 8/107; 8/111
[58] Field of Search ............... 162/78, 76, 71; 8/111, 8/107; 210/701

[56] References Cited

U.S. PATENT DOCUMENTS

| | | | |
|---|---|---|---|
| 3,449,254 | 6/1969 | Suiter | 8/107 |
| 3,759,783 | 9/1973 | Samuelson et al. | 162/65 |
| 3,766,078 | 10/1973 | Kowalska | 8/111 |
| 3,839,215 | 10/1974 | Mulders | 252/181 |
| 3,860,391 | 1/1975 | Kling et al. | 162/78 |
| 3,865,685 | 2/1975 | Hebbel et al. | 162/78 |
| 3,867,246 | 2/1975 | Hebbel et al. | 162/78 |
| 3,951,840 | 4/1976 | Fujinu et al. | 252/106 |

*Primary Examiner*—William F. Smith
*Attorney, Agent, or Firm*—Spencer & Kaye

[57] ABSTRACT

Process for stabilizing solutions of peroxidic compounds used for bleaching. At least one polymer derived from an alpha-hydroxyacrylic acid, which contains units of the formula

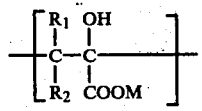

where $R_1$ and $R_2$ represent hydrogen or an alkyl group comprising from 1 to 3 carbon atoms which can be substituted by a hydroxyl group or a halogen atom, $R_1$ and $R_2$ being identical or different, and where M represents an alkali metal atom, a hydrogen atom or an ammonium group, is added to the solution as a stabilizer.

12 Claims, No Drawings

PROCESS FOR STABILIZING SOLUTIONS OF PEROXIDIC COMPOUNDS USED FOR BLEACHING

CROSS REFERENCE TO RELATED APPLICATION

This application is a continuation-in-part of applicant's copending U.S. application Ser. No. 769,666, filed Feb. 17th, 1977 abandoned.

BACKGROUND OF THE INVENTION

The present invention relates to a process for stabilizing a solution containing a peroxidic compound used for the bleaching of products such as textiles and paper pulps.

Bleaching of different materials such as textiles and paper pulps can be carried out using various peroxidic compounds. Among the latter, hydrogen peroxide and sodium peroxide are often employed, hydrogen peroxide being used preferentially.

Solutions containing only hydrogen peroxide are relatively ineffective in bleaching, and therefore, it is essential to activate them by the addition of alkalis in order to improve the bleaching power. Sodium hydroxide is frequently used to this end. However, if the alkaline agent is added alone, it induces much too rapid and much too great a decomposition of the hydrogen peroxide, so that a not insignificant part of the latter is lost for bleaching.

Consequently, this has led to the simultaneous introduction of stabilizers into the bleaching medium in such a way as to control the decomposition of the hydrogen peroxide induced by the basic compound. The relative concentration of stabilizer/basic compound is chosen so as to ensure the best bleaching power.

In the past, several stabilizers have been proposed. Among these, one of the most commonly used is sodium silicate. However, sodium silicate suffers from the disadvantage of giving a rough feel to the bleached materials, which proves particularly objectionable in the field of tissue papers and of textiles. In addition, for textiles, it gives rise to encrustation phenomena which are also very objectionable.

Other organic-type compounds have also been proposed as stabilizers for peroxidic solutions. Among these, the magnesium salts or complexes of the polycarboxylates and polyhydroxycarboxylates described in German Published Patent Application No. 2,035,047, filed on July 15th, 1970 by DEGUSSA, are to be mentioned particularly. However, these polymers allow neither as good a stabilization of the hydrogen peroxide, nor as good a degree of bleaching to be obtained as that obtained with sodium silicate.

Moreover, during bleaching of products such as textiles and paper pulps by solutions containing peroxidized compounds, one observes a degradation of the cellulosic chains and a reduction in their degree of polymerization, which leads to a reduction in the mechanical strength (to tearing, tension, bursting (or rupture), etc.) of the finished products. The hydrogen peroxide stabilizers cited above do not assure an effective protection of the cellulosic chains against this depolymerization.

SUMMARY OF THE INVENTION

There has now been found, in accordance with the present invention, a process which does not suffer from the above disadvantages and which allows the stabilization of peroxidic solutions used in bleaching to be improved, and simultaneously, a better degree of bleaching to be obtained than that obtained when using known stabilizers, and which permits protecting the cellulosic chains by avoiding their depolymerization by the hydrogen peroxide during the bleaching treatment and thereby resulting in improvement in the mechanical resistance of the finished products, while giving to the bleached products a soft and agreeable touch, and not inducing encrustation phenomena.

The present invention, as embodied and broadly described, provides a process for the stabilization of solutions of peroxidic compounds used for bleaching, comprising adding to the solution, as a stabilizer, at least one polymer derived from an alpha-hydroxyacrylic acid, which polymer contains units of the formula

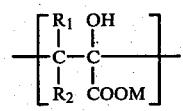

where $R_1$ and $R_2$ represent hydrogen or an alkyl group comprising from 1 to 3 carbon atoms which can be substituted by a hydroxyl group or by a halogen atom, $R_1$ and $R_2$ being identical or different, and where M represents an alkali metal atom, a hydrogen atom or an ammonium group.

The present invention further relates to a process for bleaching paper pulp or cellulosic fibers with such a stabilized solution. The process results in the obtaining of cellulosic fibers, which are less attacked (depolymerized) than those treated by using stabilizers such as silicates or hydroxycarboxylic polymers of the POC type. This particularity of the process of the present invention constitutes a very appreciable advantage in the case of the treatment of cellulosic materials.

DETAILED DESCRIPTION OF THE INVENTION

The hydroxycarboxylated polymers which can be used according to the present invention are polymers which have a main carbon chain substituted by hydroxyl groups and by carboxyl groups —COOM. Preferably, M represents a sodium or potassium atom or an ammonium group. The best results are obtained when M represents a sodium atom. The polymers used according to the invention are preferably polymers such as defined above, for which $R_1$ and $R_2$ represent hydrogen or an unsubstituted methyl group, $R_1$ and $R_2$ being identical or different. The best results are obtained with polymers where $R_1$ and $R_2$ represent hydrogen.

The polymers used in the present invention are chosen from among homopolymers and copolymers containing units such as defined above in formula I, these being of the same type or several different types. Thus, the polymers are either homopolymers only containing monomeric units of formula I; or copolymers containing: (a) nothing but comonomers of formula I, but different by nature of $R_1$, $R_2$ and/or M; or (b) monomers of formula I copolymerized with another monomer; those other monomers can be advantageously substituted by carboxyl or hydroxyl groups. If copolymers are used, they are chosen from among those which contain at least 20% of units such as defined above in formula I, and preferably, from among those which contain a least 50% of such units. The best results are obtained with polymers which contain only units such as defined above in formula I.

Among the copolymers which can be used are those which contain units derived from vinyl monomers substituted by groups chosen from among the hydroxyl and carboxyl groups. Advantageously, these copolymers contain acrylic units of the formula

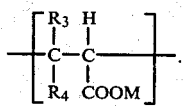

II where $R_3$ and $R_4$ represent a hydrogen atom or an alkyl group containing from 1 to 3 carbon atoms, and where M has the same meaning as above. Among these copolymers, it is preferable to use those containing acrylic units derived from unsubstituted acrylic acid where $R_3$ and $R_4$ represent hydrogen.

The average molecular weight of the polymers employed is greater than about 300. It is generally between 1,000 and 1,000,000. Preferably, it is between 2,000 and 800,000.

The hydroxyacrylic polymers used according to the present invention can be employed directly in the form of salts of poly-alpha-hydroxyacrylic acids. A mixture containing at least one poly-alpha-hydroxyacrylic acid and at least one alkali metal basic compound can be used for the operations carried out in alkaline medium. In these cases, the polymers can be employed in the form of the corresponding polylactones. The polylactones derived from poly-alpha-hydroxyacrylic acids according to the invention are inter- and/or intra-molecular esters obtained by reacting the acid functions of the polymers with the alcohol functions, the functions being partially or totally lactonized. The degree of lactonization of the function in question is generally between 30 and 100%. The poly-alpha-hydroxyacrylic acids are employed conjointly with at least one basic compound, which is, in general, chosen from among the hydroxides and basic salts of alkali metals. Sodium hydroxide is preferred.

A particularly suitable polymer is sodium poly-alpha-hydroxyacrylate.

The polymers used according to the invention can be prepared by any suitable process. A process for the preparation of these polymers is described in Belgian Pat. No. 817,678, filed on July 15th, 1974, in the name of Solvay & Cie.

The polymers used as stabilizers according to the invention can be employed alone, mixed with one another, or mixed with other stabilizers which are in themselves known.

The process of the invention is applicable to the stabilization of all types of peroxidic solutions used for bleaching. These solutions can either be true solutions or liquid-liquid emulsions. In general, they contain at least one solvent and at least one peroxidic compound. Generally, the solvent contains water and, most often, it consists exclusively of water. The solutions can thus be either a true aqueous solution or an emulsion in water of at least one liquid organic compound chosen preferably from among the aromatic solvents and the chlorinated hydrocarbons containing from 1 to 3 carbon atoms. The process of the invention applies more particularly to the stabilization of aqueous solutions of peroxidic compounds used for bleaching.

The peroxidic compounds are preferably chosen from among hydrogen peroxide and the alkali metal peroxides such as potassium and sodium peroxide. The process of the invention is preferentially applicable to the stabilization of aqueous solutions of hydrogen peroxide used for bleaching.

The quantity of peroxidic compounds and of polymers in the solution according to the invention are independently of each other comprised between 0.01 and 30% by weight relative to the weight of the solvent. Preferably a suitable solution comprises 0.1 to 25% by weight of peroxidic compound and 0.1 to 25% by weight of the stabilizer relative to the weight of the solvent.

The quantity of polymers employed in the solutions of peroxidic compounds according to the invention can vary within very wide limits. In general, the quantity of polymers is such that the weight ratio of polymer to peroxidic compound is between 0.001:1 and 20:1, and preferably between 0.1 and 10. However, different ratios can also be used according to the use for which the solution is intended.

Solutions of peroxidic compounds stabilized according to the invention can be used to very different ends. They are particularly advantageously used for the bleaching of paper pulps, textiles, and fibers. The present invention, therefore, also relates to the use of stabilized solutions, as defined above, for the bleaching of paper pulps, textiles and fibers.

The solutions of the present invention are thus advantageously used for the bleaching of different types of paper pulps, such as mechanical pulps, chemical and semi-chemical pulps, mechanical-chemical pulps, or thermomechanical pulps.

For this particular use, in addition to a peroxidic compound, a solvent which is preferably water, and the stabilizer, the solution also contains a base which is preferably chosen from among sodium hydroxide and potassium hydroxide, sodium hydroxide being used preferentially. It is also possible to add to the solution various other additives sometimes used for bleaching of paper pulps, such as, for example, wetting agents.

The bleaching temperatures for paper pulps can vary. In general, they are between 30° and 180° C. It is possible to work at atmospheric pressure or at higher pressures. The duration of bleaching can vary between rather wide limits. In general, it is between 1 minute and 5 hours, but much longer durations can also be suitable. In general, the quantity of stabilized peroxidic solution employed is such that the consistency of the pulp is between 0.1 and 60%, and preferably between 1 and 50%. The constituents are usually present at the rate of, respectively, 0.1 to 50% by weight of peroxidic compound, 0.1 to 50% by weight of basic compound, 0.1 to 50% by weight of stabilizer, and 0 to 5% by weight of various additives, relative to the weight of dry pulp. A particularly suitable solution contains from 0.5 to 8% of hydrogen peroxide, from 0.5 to 8% of sodium hydroxide and from 0.1 to 5% of stabilizer according to the invention, relative to the weight of dry pulp. If the bleaching baths are recycled, it is possible to use higher concentrations of constituents.

The bleaching of paper pulp can take place in any apparatus which is in itself known, such as refiners, towers and bleaching engines. It is also possible to spray solutions onto the sheet of pulp before drying.

The stabilized solutions according to the invention can also advantageously be used for the bleaching of different types of fibers, such as cellulosic fibers, for example, jute fibers, cotton fibers, linen fibers, ramie fibers or sisal fibers and artificial fibers made from regenerated cellulose, such as rayon, viscose rayon and cellulose acetate, and the corresponding textiles. It is also possible to use the solutions for bleaching synthetic fibers or for preventing their yellowing during some particular treatment, stages, such as the bluing stage, for example.

For this particular use, a base which is preferably chosen from among sodium hydroxide and potassium hydroxide, sodium hydroxide being used preferentially, as well as various other additives, such as, for example, wetting agents, optical bluing agents, antistatic agents, softening agents and de-sizing agents, are added to the stabilized solutions of the invention.

The bleaching temperatures for textiles and for fibers can vary within rather wide limits, most often between 20° and 180° C. It is possible to work at atmospheric pressure or at higher pressures. The duration of bleaching can also vary within wide limits, most often between 1 minute and 5 hours. It is, of course, understood that longer durations can also be suitable.

The bleaching solutions stabilized according to the invention are employed at the rate of 1 to 50 times, and preferably 2 to 30 times, the weight of dry textile to be bleached. In general, they contain from 0.2 to 50% by weight of peroxidic compound, from 0.2 to 50% by weight of basic compound, from 0.1 to 50% by weight of stabilizer and from 0 to 10% by weight of various additives usually employed in compositions for the bleaching of textiles, relative to the weight of dry textile. A particularly suitable solution contains from 0.5 to 10% of hydrogen peroxide, from 0.5 to 10% of sodium hydroxide, from 0.5 to 10% of stabilizer according to the invention, from 0 to 5% of a wetting agent, from 0 to 3% of an antistatic agent, from 0 to 3% of an optical bluing agent and from 0 to 5% of various additives, relative to the weight of dry textile. If the bleaching baths are recycled, it is possible to use higher concentrations of additives.

Generally, the wetting agent is a surface-active agent chosen from among the anionic, non-ionic, cationic or ampholytic and amphoteric surface-active agents. Examples of surface-active agents which can be suitable for the process of the invention are described in the book "SURFACE ACTIVE AGENTS" by A. M. Schwarz and J. W. Perry.

The bleaching of textiles and fibers can take place in any apparatus which is in itself known, functioning either continuously, such as, for example, pad-steamers, J-boxes and U-boxes, and continuous steamers operating under pressure, or semi-continuously, such as, for example, pad-roll machines, or, finally, discontinuously, such as, for example, winch becks, autoclaves, winding reels, jiggers and kiers.

In addition to the advantages already pointed out above, the process according to the present invention also permits the use of lesser quantities of stabilizers than in conventional processes, while giving better results, particularly from the point of view of stabilization of the peroxidic compound. In addition, contrary to conventional processes which require the presence of alkaline earth ions, such as magnesium, to obtain a good stabilization of the peroxidic compound, the process of the present invention is quite as effective in the absence of such ions as in the presence of such ions. It is therefore possible to use soft water instead of hard water for the manufacture of solutions of the present invention without harming the results obtained, which, in the case of the bleaching of textiles, allows the softness to the touch to be significantly improved. When the process of the present invention is applied to the treatment of paper pulps, one observes an increase in the viscosity of the pulps which demonstrates the fact that the cellulosic chains are less degraded.

Finally, if the process of the invention is applied to textiles, certain disadvantage which are encountered with sodium silicate and which affect the hydrophilic character and the take-up of dyestuffs are avoided.

The following examples are given by way of example and without implying a limitation in order to better demonstrate the remarkable results obtained when the process according to the invention is applied to the bleaching of paper pulps and of textiles.

EXAMPLE 1

Bleaching of Paper Pulp

Experiments were carried out in a laboratory apparatus on a mechanical spruce pulp. In all cases, the consistency of the pulp is 10%. The temperature is maintained at 60° C. and the duration of the operation is 2 hours.

The whiteness of the initial raw pulp is equal to 55.7% relative to the whiteness of MgO measured by means of an ELREPHO (ZEISS) reflectometer fitted with an R457 filter.

At the end of the treatment, a sample of pulp is removed for the determination of the consumption of peroxide and for the measurement of whiteness.

The quantities of reagents and the results obtained are given in Table I which follows. The experiments IR, 3R, 5R and 7R were carried out by way of comparison, using sodium silicate as the stabilizer, and the experiments 2, 4, 6 and 8 to 11 were carried out with a stabilizer in accordance with the present invention, namely, sodium poly-alpha-hydroxyacrylate (SPHA).

TABLE 1

| Experiment | | 1R | 2 | 3R | 4 | 5R | 6 | 7R | 8 | 9 | 10 | 11 |
|---|---|---|---|---|---|---|---|---|---|---|---|---|
| Reagents | g/100 g of dry material | | | | | | | | | | | |
| $H_2O_2$ (100% strength) | | 2.0 | 2.0 | 2.0 | 2.0 | 2.0 | 2.0 | 2.0 | 2.0 | 2.0 | 2.0 | 2.0 |
| NaOH | | 1.95 | 2.0 | 1.75 | 1.8 | 1.95 | 2.0 | 1.75 | 1.8 | 2.4 | 2.4 | 2.4 |
| Sodium silicate 38° Be | | 5.9 | — | 5.2 | — | 5.9 | — | 5.2 | — | — | — | — |
| SPHA | | — | 1.0 | — | 1.0 | — | 1.0 | — | 1.0 | 1.0 | 1.0 | 1.0 |
| $MgSO_4 \cdot 7H_2O$ | | 0.05 | 0.05 | 0.05 | 0.05 | 0.05 | 0.05 | 0.05 | 0.05 | 0.05 | — | — |
| Water hardness | French degrees of hardness | | | | | | | | | | | |
| Total | | 33 | 33 | 33 | 33 | 0 | 0 | 0 | 0 | 30 | 30 | 0 |
| Ca | | 25 | 25 | 25 | 25 | | | | | | | |

TABLE 1-continued

| Experiment | | 1R | 2 | 3R | 4 | 5R | 6 | 7R | 8 | 9 | 10 | 11 |
|---|---|---|---|---|---|---|---|---|---|---|---|---|
| Mg | | 8 | 8 | 8 | 8 | | | | | | | |
| Initial pH | | 11.3 | 11.4 | 11.1 | 11.4 | 11.1 | 11.4 | 11.0 | 11.5 | 11.6 | 11.6 | 11.5 |
| Consumption of $H_2O_2$ | % | 89.6 | 72.3 | 88.9 | 68.5 | 97 | 64.2 | 95 | 58 | 77.8 | 76 | 72 |
| Final whiteness | °SCAN | 72.3 | 74.2 | 72.2 | 73.9 | 68.8 | 74.0 | 69.2 | 73.5 | 73.2 | 73.6 | 73.7 |

Examination of Table I shows that, if the sodium silicate is replaced by a more than 5 times smaller quantity of SPHA, a very large reduction in the consumption of hydrogen peroxide and a very clear improvement in the whiteness is observed. These differences, which are very substantial in hard water, as can be seen from comparison of experiments 1R and 3R with 2 and 4, respectively, are even larger in soft water, as can be seen from a comparison of experiments 5R and 7R with 6 and 8, respectively.

EXAMPLE 2

Bleaching of Paper Pulp

The experiments below were carried out under the same conditions as experiment 6 of Table I, except that the concentration of SPHA was modified so as to measure the effectiveness of the SPHA relative to its concentration. The results obtained are reproduced in Table II below. Experiment 5R is reproduced by way of comparison.

TABLE II

| Experiment | | 5R | 12 | 13 | 6 | 14 | 15 | 16 |
|---|---|---|---|---|---|---|---|---|
| SPHA | g/100 g of dry material | — | 0.3 | 0.6 | 1.0 | 1.3 | 1.6 | 2.0 |
| Sodium silicate | | 5.9 | — | — | — | — | — | — |
| Consumption of $H_2O_2$ | % | 97 | 93.4 | 71.6 | 64.2 | 64.4 | 64.4 | 64.4 |
| Final whiteness | °SCAN | 68.8 | 70.3 | 73.1 | 74.0 | 73.8 | 73.9 | 74.0 |

Examination of Table II shows that, even for concentrations of SPHA of only 0.3 g/100 g of dry material, a better degree of whiteness is obtained than when sodium silicate is used at the rate of 5.9 g/100 g of dry material.

EXAMPLE 3

Bleaching of Textiles

Experiments were carried out in a laboratory apparatus of about 4 l capacity on a greige cotton knitted fabric. About 170 g of the knitted fabric and a quantity of the solution containing the reagents such that the liquor to goods ratio is equal to 1:15 are introduced into the beck.

The whiteness of the initial greige cotton is equal to 55.4% relative to the whiteness of MgO measured by means of an ELREPHO (ZEISS) reflectometer fitted with an R457 filter.

Two series of experiments were carried out, one in an open beck at 95° C. and the other in an autoclave at 120° C. In the first series of experiments, the temperature is taken up to 95° C. in 20 minutes and this temperature is held for 1 hour 40 minutes. In the second series of experiments, the temperature is taken up to 120° C. in 30 minutes and this temperature is held for 1 hour 30 minutes.

After bleaching, the consumption of hydrogen peroxide is measured, and then the material is washed three times, one wash being at 80° C. The final whiteness of the cotton is then measured.

The experiments were carried out with water having a hardness of 10 French degrees of hardness sub-divided as follows: Ca: 8 French degrees of hardness, and Mg: 2 French degrees of hardness.

The concentrations of reagents and the results obtained are reported in Table III below. Experiments 17R, 18R, 20R, 21R, 23R and 24R were carried out by way of comparison with, as the stabilizer, either sodium silicate or commercial polyhydroxycarboxylate type OS.3520 (POC) from DEGUSSA (experiments 18R, 21R and 24R). Experiments 19, 22 and 25 were carried out with a stabilizer in accordance with the present invention, namely, sodium poly-alpha-hydroxyacrylate (SPHA).

TABLE III

| Experiment | | 17R | 18R | 19 | 20R | 21R | 22 | 23R | 24R | 25 |
|---|---|---|---|---|---|---|---|---|---|---|
| Temperature | °C. | 95 | 95 | 95 | 120 | 120 | 120 | 120 | 120 | 120 |
| Reagents | g/100 g of dry material | | | | | | | | | |
| $H_2O_2$ | | 1.0 | 1.0 | 1.0 | 0.5 | 0.5 | 0.5 | 1.0 | 1.0 | 1.0 |
| NaOH | | 0.8 | 0.8 | 0.8 | 0.5 | 0.5 | 0.5 | 0.8 | 0.8 | 0.8 |
| Sodium silicate | | 2.0 | | | 1.5 | | | 2.0 | | |
| POC | | | 1.0 | | | 0.8 | | | 1.0 | |
| SPHA | | | | 1.0 | | | 0.8 | | | 1.0 |
| Wetting agent (LEOPHEN KB) | | 0.8 | 0.8 | 0.8 | 0.8 | 0.8 | 0.8 | 0.8 | 0.8 | 0.8 |
| Initial pH | | 11.3 | 11.4 | 11.1 | 11.2 | 11.5 | 11.5 | 11.4 | 11.4 | 11.5 |
| Consumption of $H_2O_2$ | % | 64 | 72 | 39 | 87 | 93 | 75 | 86 | 95 | 72 |
| Final whiteness | °SCAN | 80.8 | 80.8 | 81.8 | 74.5 | 74.0 | 76.4 | 83.0 | 81.7 | 84.9 |

Examination of Table III shows that much better results are obtained, as much from the point of view of the consumption of hydrogen peroxide as of the whiteness, by using the stabilizer of the present invention. In addition, if experiments 18R, 21R and 24R are compared with, respectively, experiments 19, 22 and 25, it is found that the derivatives of the poly-α-hydroxyacrylate type are much more effective than commercial polyhydroxycarboxylates.

EXAMPLE 4

Bleaching of Paper Pulp

Experiments were performed in a laboratory apparatus on a mechanical pulp of picea (spruce). The consistency of the pulp is in all cases 12%. The temperature is maintained at 65° C. and the duration of the operation is two hours.

At the end of the treatment, a sample of the pulp is withdrawn for the determination of the consumption of peroxide and for measurement of the viscosity. The viscosity is measured according to the "viscosity pipet method" described in the "Suggested Method" T230 su-66 of the Technical Association of the Pulp and Paper Industry, (TAPPI).

The reactant contents and the results obtained are given in Table IV below.

The product POC referred into Table IV is a sodium polyhydroxycarboxylate produced by DEGUSSA and described in German Patent Application No. 2,035,047.

TABLE IV

| Experiment | 26R | 27 | 28 | 29 | 30 | 31R | 32R | 33R | 34R |
|---|---|---|---|---|---|---|---|---|---|
| Reactants g/100 g of dry material | | | | | | | | | |
| H$_2$O$_2$ (100%) | 0.5 | 0.5 | 0.5 | 0.5 | 0.5 | 0.5 | 0.5 | 0.5 | 0.5 |
| NaOH | 0.7 | 0.7 | 0.7 | 0.7 | 0.7 | 0.7 | 0.7 | 0.7 | 0.7 |
| Sodium silicate 38° Bé | 3.0 | | | | | | | | |
| SPHA | | 0.05 | 0.15 | 0.30 | 0.60 | | | | |
| POC | | | | | | 0.05 | 0.15 | 0.30 | 0.60 |
| MgSO$_4$.7H$_2$O | 0.05 | 0.05 | 0.05 | 0.05 | 0.05 | 0.05 | 0.05 | 0.05 | 0.05 |
| pH initial | 11.1 | 11.4 | 11.4 | 11.4 | 11.4 | 11.4 | 11.4 | 11.2 | 11.1 |
| consumption % of H$_2$O$_2$ | 50.7 | 18.8 | 22.4 | 20.3 | 20.9 | 46.7 | 54.8 | 46.7 | 54.8 |
| viscosity, cp | 13.6 | 15.3 | 15.1 | 14.9 | 15.3 | 13.6 | 12.9 | 13.7 | 13.3 |

Examination of Table IV shows that when the sodium silicate is replaced by clearly smaller quantities of SPHA, there is observed not only an increase in the stability of the hydrogen peroxide, but equally viscosities which are 10–15% greater (comparison of experiment 26R with experiments 27, 28, 29 and 30). Translated to the level of the depolymerization of the cellulosic fibers, this means cellulosic fibers coming from a treatment with SPHA comprise on the average around 1200 monomeric units while those treated with sodium silicate only contain around 1000. This advantageous effect of the SPHA is not observed for the other hydroxycarboxylic polymers of the POC type (comparison of experiments 27, 28, 29 and 30, with 31R, 32R, 33R and 34R).

Examination of Table IV equally shows that the protection against depolymerization is achieved with minimal quantities of SPHA (experiment 27) and does not vary substantially with the quantity utilized (experiments 28, 29 and 30).

It will be understood that the above description of the present invention is susceptible to various modifications, changes and adaptations, and the same are intended to be comprehended within the meaning and range of equivalents of the appended claims.

What is claimed is:

1. Process for bleaching paper pulp or cellulosic fibers by contacting the paper pulp or cellulosic fibers with a stabilized solution containing water, a peroxidic compound used for bleaching and a stabilizer, which stabilizer is at least one polymer derived from an alpha-hydroxyacrylic acid, which polymer is a homopolymer and contains units of the formula:

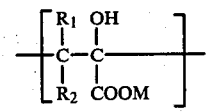

where R$_1$ and R$_2$ represent hydrogen or an alkyl group comprising from 1 to 3 carbon atoms which can be substituted by a hydroxyl group or a halogen atom, R$_1$ and R$_2$ being identical or different, and where M represents a sodium or potassium atom or an ammonium group, said peroxide compound being present in an amount between 0.01 and 30% by weight relative to the weight of solvent, said polymer having an average molecular weight of between 2,000 and 800,000 and being present in an amount between 0.01 and 30% by weight relative to the weight of water.

2. Process according to claim 1, wherein M represents a sodium atom.

3. Process according to claim 2, wherein the polymer is sodium poly-alpha-hydroxyacrylate.

4. Process according to claim 1, wherein the solution contains hydrogen peroxide as the peroxidic compound.

5. Process according to claim 1, wherein the solution contains a basic compound.

6. Process according to claim 5, wherein the basic compound is sodium hydroxide.

7. A process according to claim 1, wherein the material being bleached is a paper pulp.

8. A process according to claim 7, wherein the paper pulp is a mechanical pulp, a chemical pulp, a semi-chemical pulp, a mechanical-chemical pulp, or a thermomechanical pulp.

9. A process according to claim 1, wherein the material being bleached is a cellulosic fiber.

10. A process according to claim 9, wherein the cellulosic fiber is a jute fiber, cotton fiber, linen fiber, ramie fiber, or sisal fiber.

11. A process according to claim 9, wherein the cellulosic fiber is an artificial fiber made from regenerated cellulose.

12. A process according to claim 11, wherein the artificial fiber is rayon, viscose rayon, or cellulose acetate.

* * * * *